(12) United States Patent
Elpers et al.

(10) Patent No.: US 10,576,345 B2
(45) Date of Patent: Mar. 3, 2020

(54) BASKETBALL BACKBOARD ASSEMBLY

(71) Applicant: Indian Industries, Inc., Evansville, IN (US)

(72) Inventors: Philip Elpers, Evansville, IN (US); Robert W. Cornell, Evansville, IN (US)

(73) Assignee: Indian Industries, Inc., Evansville, IN (US)

( * ) Notice: Subject to any disclaimer, the term of this patent is extended or adjusted under 35 U.S.C. 154(b) by 43 days.

(21) Appl. No.: 16/037,635

(22) Filed: Jul. 17, 2018

(65) Prior Publication Data

US 2018/0333626 A1   Nov. 22, 2018

Related U.S. Application Data

(63) Continuation of application No. 15/047,847, filed on Feb. 19, 2016, now Pat. No. 10,130,860, which is a continuation of application No. 14/973,891, filed on Dec. 18, 2015, now Pat. No. 10,272,308, which is a continuation of application No. 14/794,218, filed on Jul. 8, 2015, now Pat. No. 10,052,540.

(51) Int. Cl.
   *A63B 63/08*  (2006.01)
   *B29C 53/04*  (2006.01)

(52) U.S. Cl.
   CPC ............ *A63B 63/083* (2013.01); *B29C 53/04* (2013.01); *Y10T 29/49826* (2015.01); *Y10T 29/49895* (2015.01); *Y10T 29/49947* (2015.01); *Y10T 29/49948* (2015.01); *Y10T 29/49963* (2015.01)

(58) Field of Classification Search
   CPC ............ A63B 63/083; Y10T 29/49895; Y10T 29/49963; Y10T 29/49947; Y10T 29/49826; Y10T 29/49948; Y10T 403/42; Y10T 403/73; B29C 53/04
   USPC ................. 264/339; 29/428, 525.01, 525.11, 29/525.02, 464; 473/481, 482; 403/205, 403/403
   See application file for complete search history.

(56) References Cited

U.S. PATENT DOCUMENTS

| | | |
|---|---|---|
| 2,254,507 A | 9/1941 | Albach et al. |
| 3,017,183 A | 1/1962 | Chalcroft |
| 3,260,780 A | 7/1966 | Wright et al. |
| 3,788,642 A | 1/1974 | Matras et al. |
| 3,832,254 A | 8/1974 | Bowset et al. |
| 3,964,743 A | 6/1976 | Salsich, Sr. |
| 4,111,420 A | 9/1978 | Tyner |
| 4,124,968 A | 11/1978 | Stevens et al. |
| 4,194,734 A | 3/1980 | Tyner |
| 4,320,896 A | 3/1982 | Engle et al. |
| 4,372,555 A | 2/1983 | Sorensen |
| 4,377,283 A | 3/1983 | Mahoney |

(Continued)

*Primary Examiner* — Sarang Afzali
*Assistant Examiner* — Darrell C Ford
(74) *Attorney, Agent, or Firm* — Woodard, Emhardt, Henry, Reeves & Wagner, LLP; Charles Meyer (57) ABSTRACT

Certain embodiments of the present disclosure describe a frameless basketball backboard assembly and a method for producing a frameless basketball backboard assembly. A mounting structure is attached to one side of the backboard assembly, and a support assembly mounted to the backboard assembly connects the backboard assembly to a base. A rim may be added to a side of the backboard assembly by attaching to the support assembly.

20 Claims, 9 Drawing Sheets

(56) References Cited

U.S. PATENT DOCUMENTS

| | | | |
|---|---|---|---|
| 4,395,040 A | 7/1983 | White | |
| 4,424,968 A | 1/1984 | Smith | |
| 4,588,188 A | 5/1986 | Mahoney et al. | |
| 4,676,503 A | 6/1987 | Majoney et al. | |
| 4,798,381 A | 1/1989 | Dadbeh | |
| 4,895,365 A | 1/1990 | Schroeder | |
| 5,052,160 A | 10/1991 | Gentsch et al. | |
| 5,255,910 A | 10/1993 | Simonseth | |
| 5,279,496 A | 1/1994 | Schroeder | |
| 5,377,976 A | 1/1995 | Matherne et al. | |
| 5,536,003 A * | 7/1996 | Brenner | A63B 63/083 273/402 |
| 5,570,880 A | 11/1996 | Nordgran | |
| 5,626,339 A | 5/1997 | Schickert et al. | |
| 5,713,806 A * | 2/1998 | Teitgen | A63B 71/0054 473/481 |
| 5,800,757 A | 9/1998 | Abrams et al. | |
| 5,816,955 A | 10/1998 | Nordgran et al. | |
| 5,919,102 A | 7/1999 | Smith et al. | |
| 5,954,601 A | 9/1999 | Abrams et al. | |
| 6,004,231 A | 12/1999 | Schickert et al. | |
| 6,007,437 A | 12/1999 | Schickert et al. | |
| 6,179,733 B1 | 1/2001 | Story | |
| 6,206,602 B1 | 3/2001 | yamamoto et al. | |
| 6,758,768 B2 | 7/2004 | Spencer | |
| 7,001,290 B2 | 2/2006 | Mower et al. | |
| 7,195,571 B2 | 3/2007 | Nye | |
| 7,331,882 B1 | 2/2008 | White | |
| 7,393,293 B2 | 7/2008 | Guerzini et al. | |
| 7,407,453 B2 | 8/2008 | Shannon | |
| 7,419,445 B2 | 9/2008 | Nye et al. | |
| 7,691,014 B2 | 4/2010 | Nye et al. | |
| 8,167,745 B2 | 5/2012 | Britto et al. | |
| 8,398,509 B2 | 3/2013 | Elpers | |
| 8,523,715 B2 | 9/2013 | Elpers | |
| 8,708,844 B2 | 4/2014 | Nye et al. | |
| 8,852,034 B2 | 10/2014 | Stevens | |
| 8,986,140 B1 | 3/2015 | Fuller | |
| 8,992,350 B2 | 3/2015 | Green et al. | |
| 2003/0054906 A1 | 3/2003 | Allshouse et al. | |
| 2003/0153414 A1 | 8/2003 | Nye | |
| 2003/0216195 A1 | 11/2003 | Britto et al. | |
| 2003/0217676 A1 | 11/2003 | Strong et al. | |
| 2004/0176195 A1 | 9/2004 | Nye et al. | |
| 2004/0195488 A1 | 10/2004 | Baldasari | |
| 2005/0059514 A1 | 3/2005 | Carey | |
| 2005/0090336 A1 | 4/2005 | Nye et al. | |
| 2005/0119074 A1 | 6/2005 | Waite et al. | |
| 2005/0215357 A1 | 9/2005 | Guerzini et al. | |
| 2006/0148598 A1 | 7/2006 | Mahoney | |
| 2006/0291221 A1 | 12/2006 | Webb | |
| 2008/0001329 A1 | 1/2008 | Vannimwegen et al. | |
| 2009/0044743 A1 | 2/2009 | Wagenknecht et al. | |
| 2009/0069130 A1 | 3/2009 | Nye et al. | |
| 2009/0158572 A1 | 6/2009 | Connerley et al. | |
| 2009/0163305 A1 | 6/2009 | Connerley et al. | |
| 2012/0252605 A1 | 10/2012 | Monroy | |
| 2013/0005514 A1 | 1/2013 | Green et al. | |
| 2016/0082330 A1 * | 3/2016 | Barnes | A63B 63/083 473/481 |

\* cited by examiner

BASKETBALL BACKBOARD ASSEMBLY

CROSS-REFERENCE TO RELATED APPLICATIONS

This application is a continuation of prior application Ser. No. 15/047,847 filed on Feb. 19, 2016 which is a continuation of application Ser. No. 14/973,891 filed on Dec. 18, 2015 which is a continuation of prior application Ser. No. 14/794,218 filed on Jul. 8, 2015, which are all incorporated herein by reference.

FIELD OF THE ENDEAVOR

The present disclosure deals with basketball goal assemblies.

BACKGROUND

A basketball goal typically includes a rim and a backboard located directly behind the rim. A basketball may bounce off of the backboard causing the ball to rebound into the rim or back into play rather than out of bounds. An offensive player may also use the backboard while shooting a layup or a bank shot. It is important that the backboard has sufficient support and rigidity to allow a basketball to bounce off the backboard without causing damage.

Many basketball goals include a steel frame around the outside edge of the backboard. This steel frame provides rigidity and strength to the backboard, allowing a basketball to bounce off of the backboard for a bank shot or after a missed shot. Although the frame provides additional support to the backboard, it also increases the weight of the backboard. The weight of the basketball goal becomes especially important for portable systems, as heavier backboards make a portable basketball goal more difficult to move. In addition to weight, cost and ease of assembly are also important factors for basketball goals, especially those used at the home. The steel frame around the outside edge of the backboard increases cost and presents additional pieces that must be added in assembly.

Therefore, there is a need for easy-to-assemble basketball goals that are lightweight, yet still that have a backboard with sufficient strength and rigidity.

SUMMARY

Certain embodiments of the present system include a frameless basketball backboard assembly and a method of producing a frameless basketball backboard assembly. The frameless basketball backboard assembly provides an aesthetically pleasing backboard and basketball goal that is lightweight, easy to produce, and easy to assemble while also providing high quality strength and resilience characteristics for optimal performance during a basketball game.

A method of producing the frameless basketball backboard assembly includes providing a flat, polygonal blank of a bendable material. A portion of the blank is defined as a backboard panel. The blank is heated near one or more portions of its outside edges. The blank is then bent along one or more lines in the heated portions to form one or more flanges. The flanges are integral with and extend rearward from the backboard panel. The blank is allowed to cool to form a rigid, one-piece backboard. After cooling, the backboard panel is attached to a support assembly which is mounted on a base assembly. A basketball rim is also mounted to the support assembly.

In another embodiment, a frameless basketball backboard assembly includes a polygonal blank which forms a backboard panel. One or more flanges integral with and extending rearward from the outside perimeter of the backboard panel provide rigidity to the backboard panel. One or more corner caps may be attached along the outside perimeter at the corners of the backboard panel. The backboard assembly may also include a backboard mounting structure that is attachable to the rearward side of the backboard panel. The backboard mounting structure may include a body portion and at least one support arm that extends to a corner cap attached on the backboard assembly. The one or more support arms may be positioned to divide the backboard panel into separate zones that are approximately the same size.

The creation of the frameless backboard assembly using bent flanges instead of a metal frame provides a clean, streamlined look that is lightweight and different from other commercially available options. However, the flange structure still provides support and rigidity that allows the backboard to operate like standard backboards that include a frame. Also, the backboard assembly may be made using acrylic, so the disclosed backboard assembly may be transparent, similar to backboard structures found in high school gyms and NBA arenas.

The present system is also easy to assemble, even when only one person is available for assembly. In some embodiments, the backboard assembly will be pre-attached to the rear side of the backboard assembly. The support assembly is mounted on a base and excludes attachment members. Then, attachment of the backboard assembly to the support assembly simply requires inserting the attachment members on the support assembly through the openings in the backboard assembly. Pin supports can be used to temporarily hold the backboard assembly to the support assembly while the rim and attachment members are attached in front of the backboard. This allows the rim to be attached and secured from one side without having to manually hold the backboard and the support assembly in place and without having to install fasteners from both sides of the backboard.

Further objects, features and advantages of the present invention shall become apparent from the detailed drawings and descriptions provided herein.

DESCRIPTION OF PREFERRED EMBODIMENTS

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

The present disclosure pertains generally to the field of basketball goals and particularly to basketball backboard assemblies. Often, frames are used around the edges of a basketball backboard to provide extra support and rigidity to the backboard. However, these frames can add cost and weight to the basketball goal. Reducing weight and the cost of the basketball goal is especially important for portable basketball hoops or other types of basketball hoops that may be installed at a home. Therefore, it is desirable to provide a frameless backboard of reduced cost and weight, yet that still has sufficient rigidity and that provides bounce characteristics similar to a backboard that includes a frame.

In certain aspects, the present disclosure provides a basketball backboard assembly that may include a backboard panel made from a blank and shaped to include at least one corner portion. At least one flange, integral with and of the same material as the backboard panel, extends rearward from the backboard panel. In some aspects, a corner cap may be secured to the corner of the backboard panel. A backboard mounting structure including a body portion can be attached to the rear side of the backboard panel. An end of at least one support arm may be attached to the body portion of the backboard mounting structure, and the other end of the support arm is attached to the corner cap. In some arrangements, the support arm or support arms divide the backboard panel into approximately equal-sized zones.

A backboard support assembly, attachable to the backboard assembly by connecting to the mounting structure, includes one or more attachment members that may be permanently attached to the support assembly in some embodiments. A set of arms extending rearward from the support assembly are used to attach the support assembly to a base assembly. The attachment members on the support assembly are aligned with openings in the backboard assembly. A rim assembly may be mounted in front of the backboard assembly and attached to the support assembly by inserting the attachment members through the openings in both the backboard assembly and openings in the rim assembly, and then securing the attachment members.

In some arrangements, the corner cap may include an opening that corresponds with an opening in the flange. A screw, or some other type of attachment, may be inserted through the openings in the corner cap and flange to attach the corner cap to the backboard assembly. Additionally or alternatively, the bottom edge of the backboard panel may be padded for safety in the event that a player hits the backboard panel with their head or some other body part.

As an example, the present disclosure illustrates a backboard assembly that is rectangular, so it includes a top edge, a bottom edge, and two side edges. Flanges may extend rearward from any one of these edges, and it is possible that only one, more than one, or all of the edges may include a flange. Corner caps may be positioned at each one of the four corner portions situated along the outside perimeter of the rectangular shaped backboard panel.

In some aspects of the present disclosure, one or more pin openings may be located in each of the support assembly and the mounting structure. A support pin may be fit through one of the pin openings to preliminarily attach the mounting structure and backboard assembly to the support assembly. The support pin may hold the backboard assembly and the support assembly together while the rim is attached in front of the backboard panel.

Other aspects of the present disclosure include a method for producing a frameless basketball backboard assembly. The method includes providing a flat, polygonal blank that has outside edges. In some embodiments, this polygonal blank may be made of acrylic, polycarbonate or another bendable material such a thermoplastic. A portion of the blank is defined to be a backboard panel. One or more portions of the blank near portions of the outside edges are heated. The blank is bent along one or more lines in the heated portions to form one or more flanges. The flanges are integral with and extend from the backboard panel. The blank is allowed to cool to form a one-piece backboard that has one or more rearward extending flanges that provide structure and rigidity to the backboard in place of a frame. The backboard panel is attached to a support assembly that is connected to a base assembly. A basketball rim is also mounted to the support assembly.

The present disclosure also provides for a method of producing a frameless basketball backboard assembly that includes attaching a backboard mounting structure to the rear side of the backboard panel. The backboard mounting structure may include a body portion and one or more support arms extending from the body portion. The one or more support arms may be positioned to divide the backboard panel into zones that have approximately the same rigidity and/or are approximately the same size. Also, a corner cap may be attached to at least one corner portion of the blank. A support arm may be attached to a leg portion of the corner cap.

In some aspects, the method for producing a frameless basketball backboard assembly may involve a polygonal blank that is rectangular with four corner portions and includes a top edge, a bottom edge, and two side edges. This aspect may include heating and bending the blank along the top edge, bottom edge, and side edges to form a flange along at least a portion of each of the four edges. The method may further include attaching a backboard mounting structure with four support arms to the rear side of the backboard panel, for example by connecting each of the support arms to a corner cap attached to each of the corner portions.

The present disclosure also provides a method for assembling a basketball goal that includes a backboard assembly that is pre-attached to a backboard mounting structure and a support assembly that is pre-attached to a base assembly. In this method, attachment members positioned on the support assembly are inserted through openings in the backboard assembly. One or more pin supports are then placed through aligned pin openings located on the support assembly and the mounting structure. The one or more pins keep the backboard assembly attached to the support assembly as a rim assembly is positioned so that the attachment members may be inserted through openings in the rim assembly. The rim is then secured in front of the backboard assembly.

Figure 1:
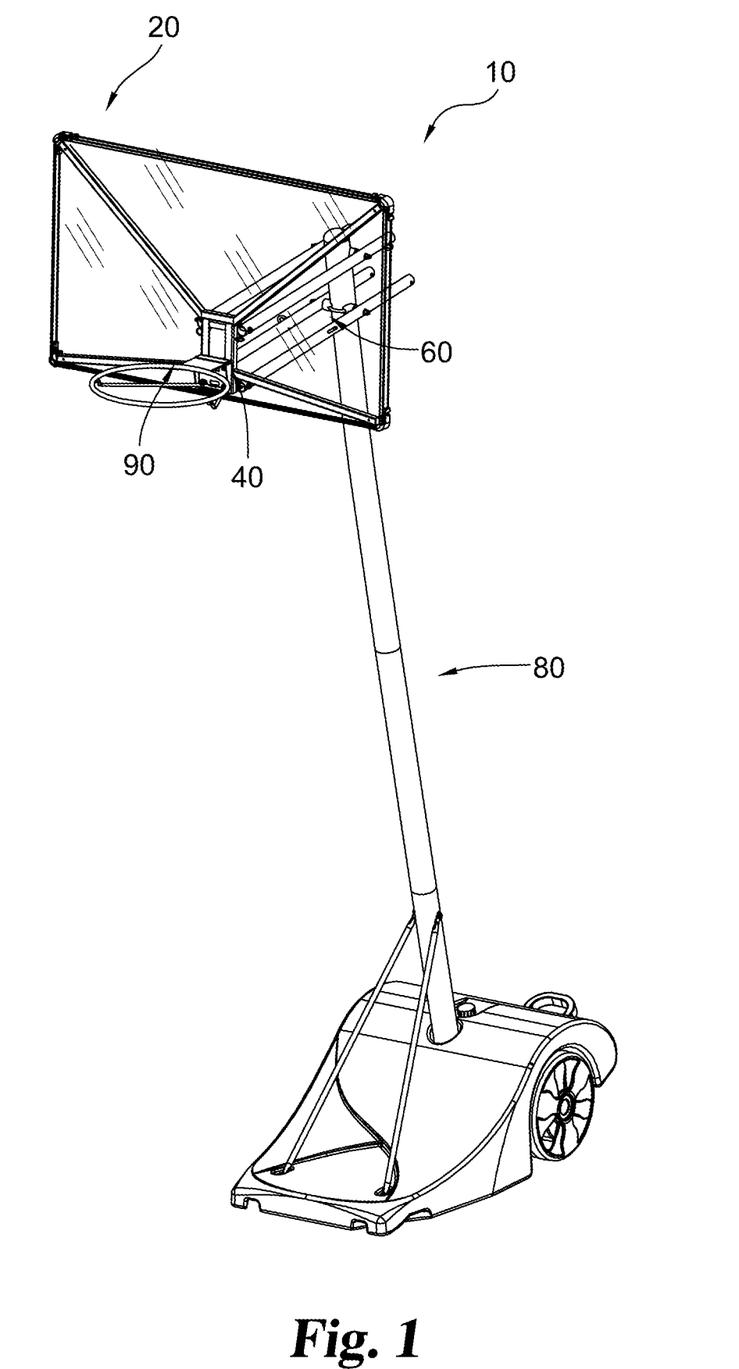
FIG. 1 is a perspective view of a basketball goal assembly.

FIG. 1 representatively illustrates a basketball goal assembly 10. Basketball goal assembly 10 includes a backboard assembly 20. A backboard mounting structure 40 is attached to the rearward surface of backboard assembly 20. Backboard mounting structure 40 allows an attachment to be made between backboard assembly 20 and one end of a backboard support structure 60, in this case a parallelogram structure. The other end of backboard support structure 60 is mounted to a base assembly 80. A basketball rim assembly 90 is attached on the front side of backboard assembly 20.

Figure 2:
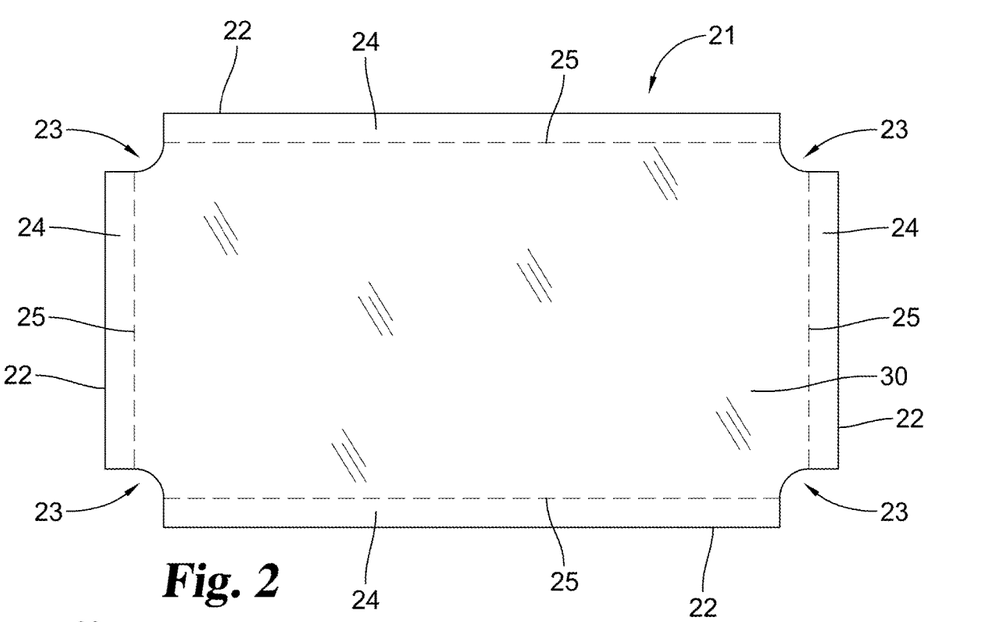
FIG. 2 is a plan view of a blank used for the backboard assembly of the basketball goal assembly of FIG. 1.

The backboard of backboard assembly 20 is formed from a flat, polygonal blank 21, such as illustrated in FIG. 2. In the embodiment shown, blank 21 is formed from a bendable sheet material, meaning a material which is bendable when heated, examples are sheets made of thermoplastic materials such as acrylic or polycarbonate; however, in other embodiments, blank 21 may be made from any other suitable backboard material. Blank 21 may be transparent, translucent or colored. It is also possible that blank 21 may be decorated or pre-printed to include company or school logos, a target rectangle, or other graphics.

Blank 21 includes a central portion 30 which becomes the backboard front face panel and outside edges 22 that form the perimeter of blank 21. Blank 21 is shaped to include at least one corner portion 23, and more particularly, a notched corner portion defined as a generally L-shaped area with a radius. In the embodiment shown in FIG. 2, blank 21 is rectangular so there are four corner portions 23; however, in other embodiments, blank 21 may be different shapes. For example, blank 21 may be hexagonal or square. Alternatively, portions of the outside edges 22 of blank 21 may be curved or rounded.

Flange portions 24 are located around the perimeter of blank 21 near outside edge 22. Originally, flange portions 24 start as flat portions of the flat blank 21. Blank 21 may be heated as a whole or only in selected areas to a temperature that gives blank 21 sufficient plasticity to allow flange portions 24 to be bent along bend lines 25 approximately 90 degrees to form flanges 28 (see FIG. 3). As shown in FIG. 2, bend lines 25 may be perpendicular to each other, or in other embodiments, bend lines 25 may be angled. Also, as shown in the embodiment of FIG. 2, corners 23 may be pre-notched to ensure that bend lines 25 do not overlap to make it easier to bend flange portions 24 that are positioned on adjacent sides of blank 21. In some embodiments, flange portions 24 corresponding to all sides of blank 21 may be bent to form flanges 28 around substantially the entire outside edge 22 of blank 21 with discontinuities at the corners; however, in other embodiments, only a portion of the outside edge 22 of blank 21 may be bent. For example, in some embodiments, only three out of four edges of blank 21 may be bent, while the remaining edge does not include a flange.

Figure 3:
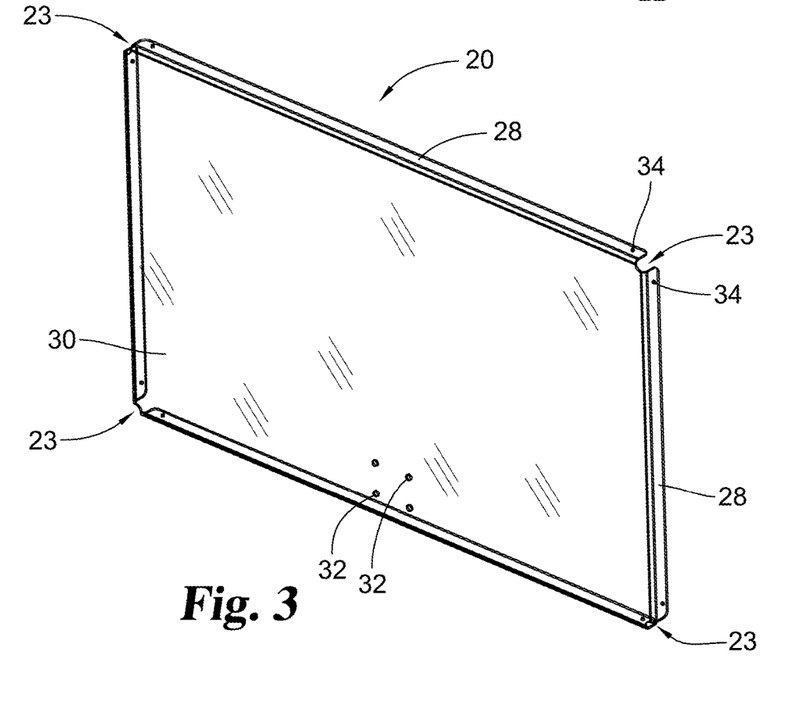
FIG. 3 is a perspective view of a backboard assembly of the basketball goal assembly FIG. 1.

FIG. 3 shows backboard assembly 20 after blank 21 has been bent along bend lines 25. Flange portions 24 are bent to create radiused edges between flanges 28 and central backboard panel section 30. The rear edges of flanges 28 may be blunt or rounded for safety, so backboard assembly 20 does not have sharp edges. Within this description, the front of backboard assembly 20 is considered to be the side of backboard panel 30 on which rim assembly 90 is attached. The rear of backboard assembly 20 is considered to be the opposite side of backboard panel 30 on which rim assembly 90 is not attached. As can be seen in FIG. 3, flanges 28 extend rearward from backboard panel 30.

In some embodiments, flange 28 may be formed by a heat and bend process, but in other embodiments, flange 28 may be formed by injection molding, or any other process that may be used to bend blank 21 or to form a backboard with a bend. In some embodiments, bend lines 25 may be positioned to form a flange 28 that extends approximately 1.5 inches rearward from backboard panel 30. Other embodiments may have larger or smaller flanges 28, for example, flange 28 may extend approximately 1 inch or flange 28 may extend approximately 2 or 3 inches.

Openings 32 may be defined through backboard panel 30 to facilitate mounting the backboard and the rim assembly. In the embodiment shown in FIG. 3, there are four openings 32 arranged to form a square. In other embodiments, there may be more than or fewer than four openings 32. Openings 32 may also be arranged in any different shape or position desired. In the embodiment shown in FIG. 3, openings 32 are centered near the bottom center portion of backboard panel 30. In other embodiments, openings 32 may be located in a different position on backboard panel 30. Still other embodiments are contemplated where backboard assembly 20 does not include backboard openings 32 and rim assembly 90 is attached to backboard assembly 20 through alternate means, such as a clamping mechanism.

Backboard assembly 20 may also include flange openings 34 located at various locations along flanges 28. Flange openings 34 may be used as attachment points for attaching objects on or around flanges 28. Openings 34 may be formed by being molded or drilled or by any other suitable method for forming openings. It is also possible that openings 34 may be created when needed by self-penetrating screws or fasteners. In the embodiment shown, flange openings 34 are adjacent the corners 23 of backboard assembly 20. Different embodiments may increase or decrease the number of flange openings 34 or position flange openings 34 at any location on flanges 28.

Figure 4:
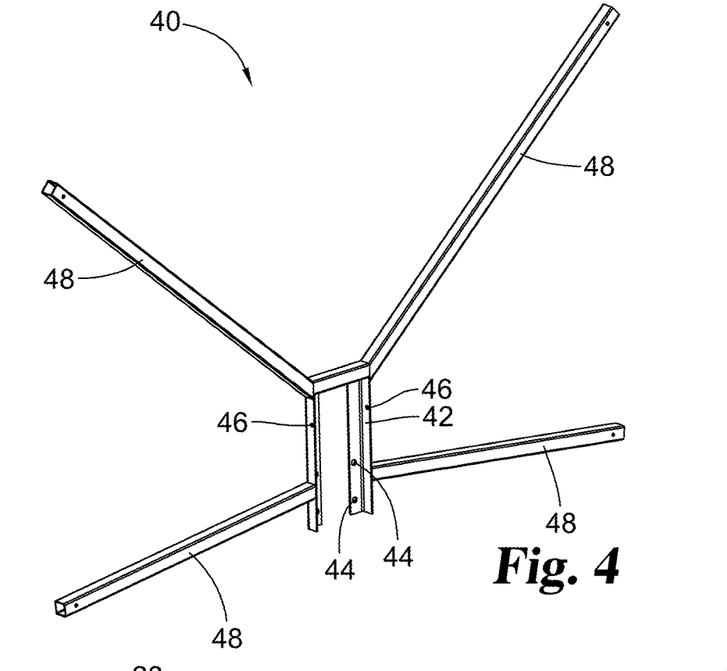
FIG. 4 is a perspective view of a backboard mounting structure of the basketball goal assembly shown in FIG. 1.

An embodiment of a backboard mounting structure 40 is shown in FIG. 4. Backboard mounting structure 40 includes a body portion 42 to be arranged near the center-bottom portion of the rear of backboard panel 30. Body portion 42 includes openings 44 that can be aligned with openings 32 in backboard panel 30. The number and arrangement of openings 44 may change in different embodiments to match the number and position of openings 32.

Optional pin support openings 46 are also located on body portion 42. In this embodiment, there is one pin support opening 46 on each side of body portion 42; however, in other embodiments, the number of pin support openings 46 may be greater than or less than two, or the location of pin support openings 46 may be changed. Backboard mounting structure 40 may also include support arms 48. One end of each support arm 48 is attached to body portion 42 and each support arm 48 may extend outward from body portion 42.

Figure 6:
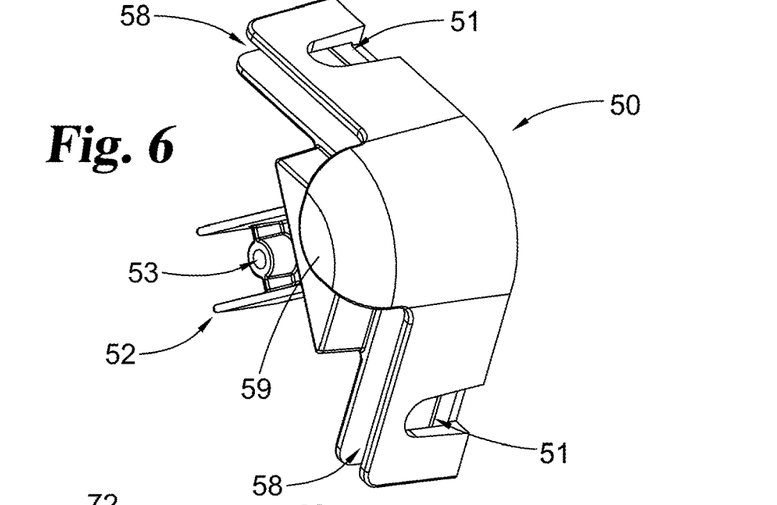
FIG. 6 is a perspective view of a corner cap that is attachable to the backboard assembly of FIG. 3.

FIG. 6 shows an embodiment of a corner cap 50. Corner cap 50 is L-shaped with a rounded corner and engages the ends of two adjacent flanges 28 when it is attached to backboard assembly 20. A pair of channels 58 in corner cap 50 are positioned to each receive an end portion of a respective flange 28. Corner cap 50 helps to provide added stability and rigidity to backboard assembly 20 by restraining the movement of adjacent flanges 28.

Figure 5:
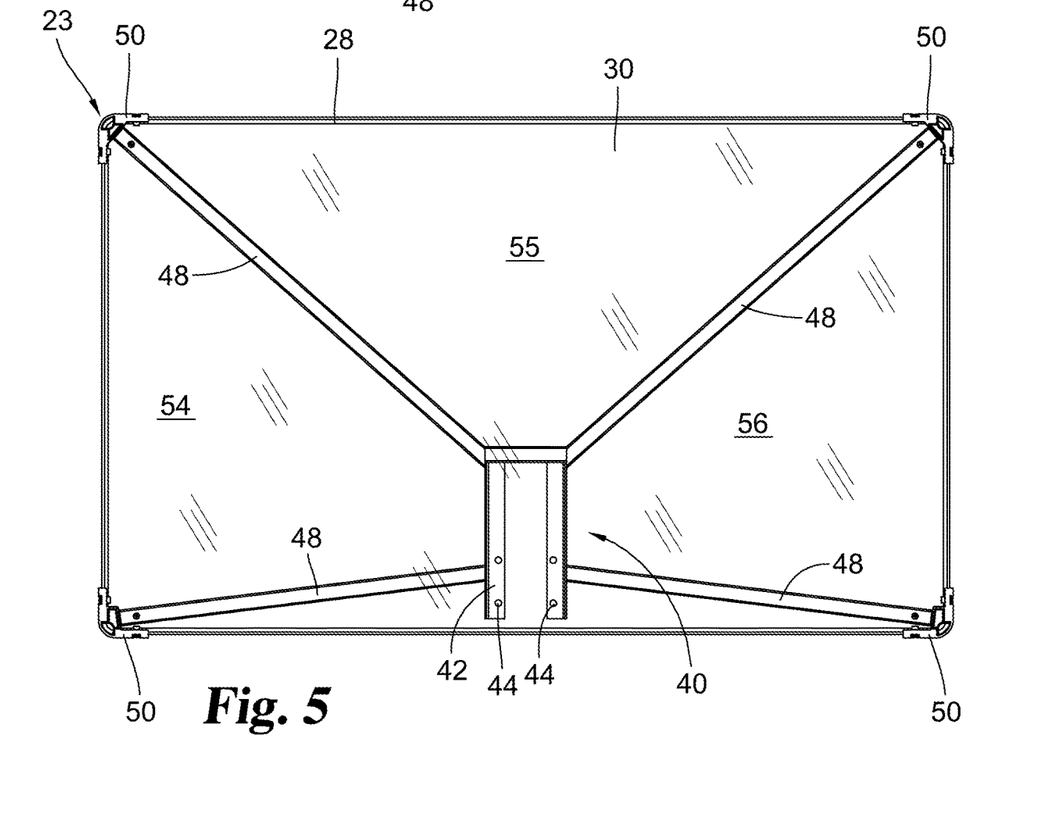
FIG. 5 is a rear view of the backboard mounting structure of FIG. 4 attached to the backboard assembly of FIG. 3.
Figure 10A:
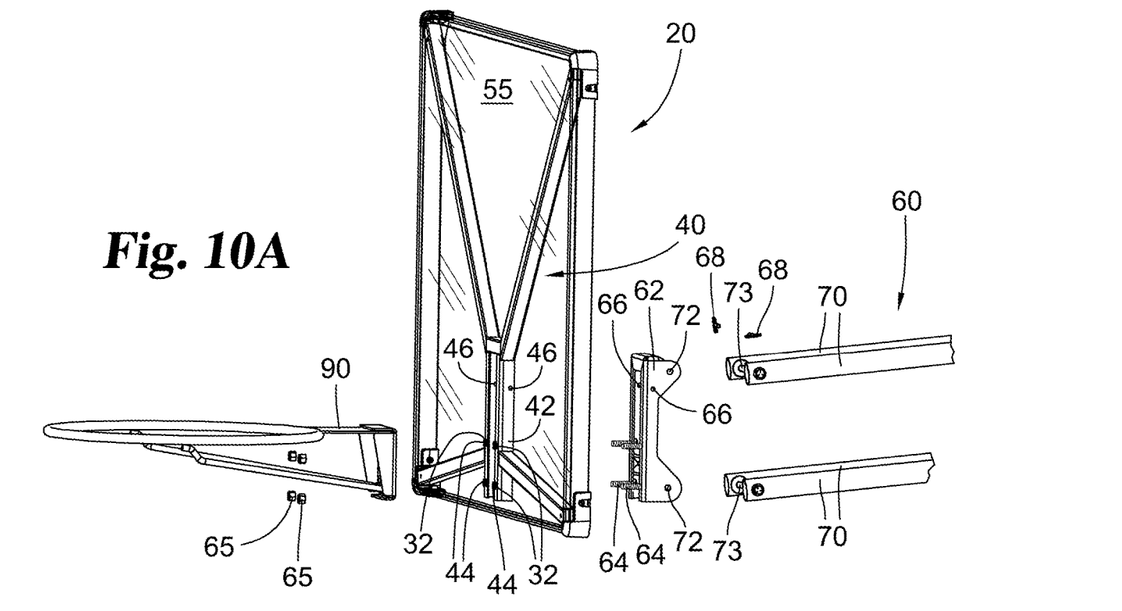
FIGS. 10A and 10B are exploded and assembled perspective views of the rim assembly of FIG. 9 attached to the backboard assembly of FIG. 3.
Figure 10B:
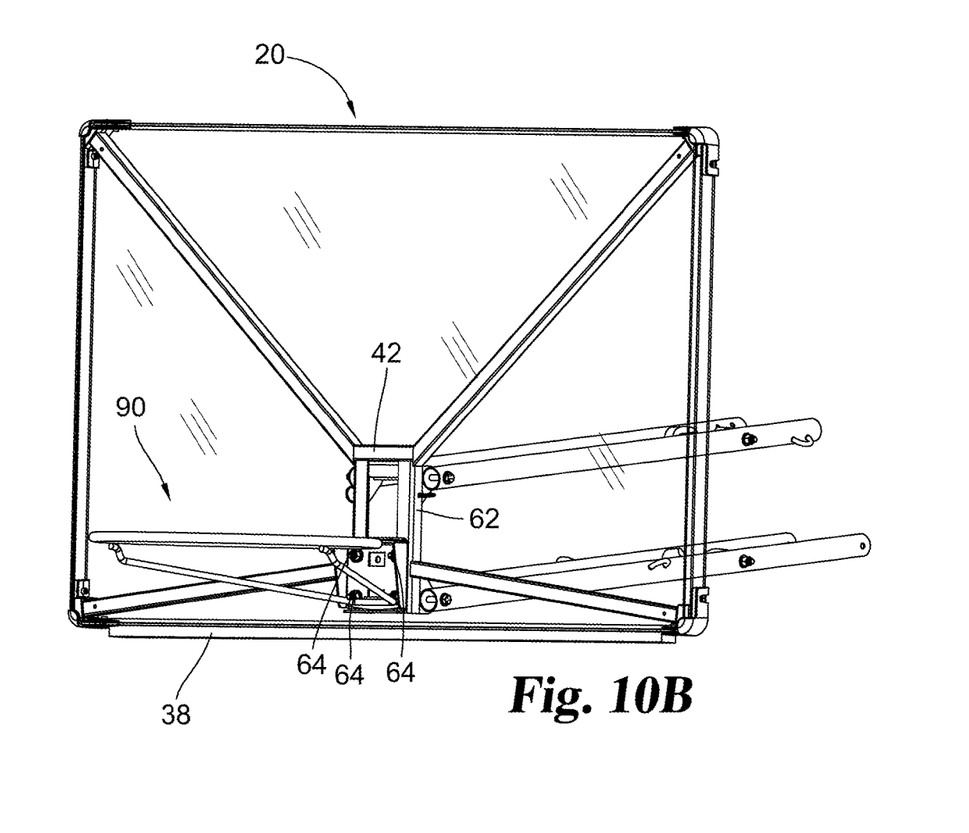

As seen in FIGS. 5 and 10, corner cap openings 51 may be located on corner cap 50 and are positioned to correspond with the position of flange openings 34 on flanges 28. When corner cap 50 is positioned on flanges 28 so that corner cap openings 51 are aligned with flange opening 34, an attachment member (not shown), such as a screw or bolt, may be inserted through openings 34, 51 to attach corner cap 50 to flanges 28. In other embodiments, corner cap 50 may optionally be attached to flanges 28 using a friction fit. Still alternately, corner cap 50 may optionally be attached to flanges 28 using adhesive, tape, injection molded contours or other options. Corner cap 50 may be made of plastic, hard or soft rubber, or any other material, such as steel or aluminum, that provides sufficient support to backboard assembly 20 by creating a corner connection between adjacent flanges 28.

Corner cap 50 may be mounted on a flange 28 so that a front portion 59 of the corner cap 50 extends toward the front side of backboard assembly 20 and/or so that a portion of corner cap 50 is on the rear side of backboard assembly 20. Front portion 59 may be flush with the front face of panel 30. In some embodiments, corner cap 50 may have a leg 52 that extends inward, toward the center of the rear of backboard assembly 20. Leg 52 may fit inside the hollow end of an arm 48, and an opening 53 through leg 52 may provide an attachment point for an arm 48 extending from body portion 42. In some embodiments, corner cap 50 may be used without connecting to an arm 48.

In some optional embodiments, a protective covering 38 may be attached along the bottom edge of the blank (see FIG. 10W. This protective covering 38 may be made of a soft material to provide padding on the bottom of the backboard assembly, providing protection in the event that a player would come into contact with the bottom edge of the backboard. The protective covering 38 may extend from one or more corner caps and could cover the entire bottom edge of the backboard or could be applied to cover only a portion of the bottom edge. It is also possible that a protective covering is applied to edges of the backboard other than the bottom edge.

FIG. 5 illustrates backboard mounting structure 40 attached to the rearward side of backboard assembly 20. In some embodiments, mounting structure 40 may come pre-attached to backboard assembly 20 or may be connected to backboard assembly 20 as part of an assembly stage. The central portion of mounting structure 40 may not be directly connected to the backboard panel, instead mounting structure 40 is secured to backboard assembly 20 at the corners by connecting support arms 48 to corner caps 50. Further, the mounting structure and backboard are secured in a sandwich or layered arrangement between the rim assembly 90 and support assembly 60 without being physically directly connected. This, in effect, provides a floating connection arrangement in the middle so that force applied to the rim assembly, for example by a player hanging on the rim, is transferred to the support assembly and is not transferred to backboard assembly 20.

As shown, each support arm 48 extends from body portion 42 to a corner cap 50 which is attached to a corner 23 of backboard assembly 20. Because the embodiment of backboard assembly 20 shown in FIG. 4 is rectangular and has four corners, there are four support arms 48. In other embodiments where backboard assembly 20 has a different shape, the number of support arms 48 may vary to match the number of corners of the backboard assembly. For example, if the backboard assembly is hexagonal, there may be six support arms extending from a body portion to each of the corners of the backboard assembly. In still other embodiments, there may be more or fewer support arms 48 than corners 23. It is also possible that the support arms do not end at a corner, but rather connect to a portion of a flange 28 or a bracket attached to a flange 28 at a position that is not located at a corner 23.

As seen in FIG. 5, support arms 48 may be positioned on backboard assembly 20 to create zones 54, 55, 56. In some embodiments, support arms 48 may be configured to produce zones on backboard panel 30 with approximately equal rigidity. These equal-rigidity zones can provide greater consistency in the bounce characteristics of the backboard panel 30 when an object such as a basketball contacts backboard panel 30. In some embodiments, the equal-rigidity zones may be formed by creating zones that are approximately equal in area.

Figure 7:
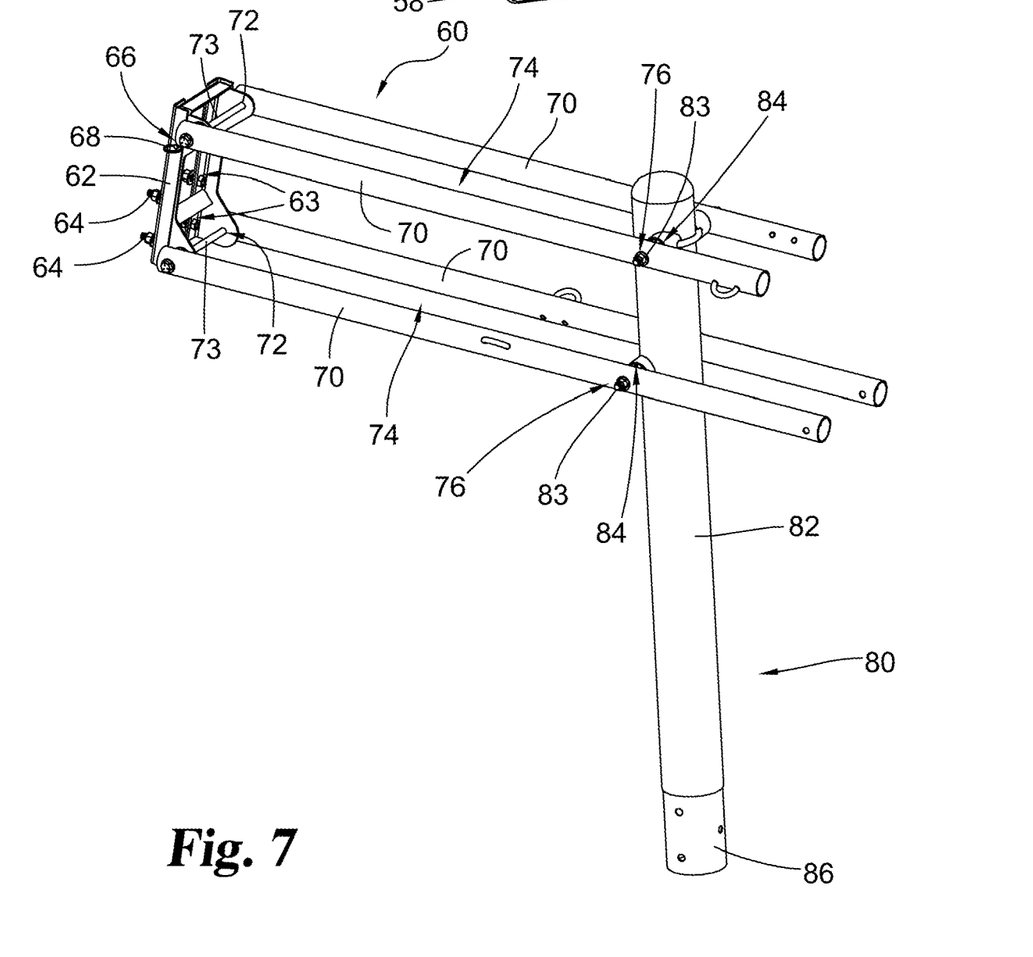
FIG. 7 is a perspective view of a backboard support assembly and base assembly of the basketball goal assembly of FIG. 1.

FIG. 7 shows the upper portion of a backboard support assembly 60 according to an embodiment of this invention. Backboard support assembly 60 includes a backboard attachment bracket 62 that is shaped to correspond with the shape of body portion 42 of backboard mounting structure 40. At least one and optionally a plurality of attachment members 64 may be preassembled or preformed so they extend from attachment bracket 62. As an example, each attachment member 64 may be a bolt or pin that has a base portion welded onto attachment bracket 62 so it is permanently attached and with a threaded portion extending forward. When the attachment members are permanently attached they are rotationally fixed to the support assembly. This allows the attachment members to be secured solely from the front side of the backboard assembly. A threadable nut 65 may be detached from the bolt to allow the welded bolt to be inserted from a rear side of the backboard assembly through mounting openings 44, backboard openings 32, and/or rim assembly openings 94. The nut 65 may then be threaded onto the protruding bolt portion from the front of the backboard assembly to secure the backboard panel and/or a rim assembly to support assembly 60, and can be tightened from the front without the assembler needing to access the rear side of the backboard assembly. For example, the assembler does not need to use any tools to hold the base end of the attachment member while tightening the nuts.

In other embodiments, attachment bracket 62 has openings 63 that may be aligned with openings 44 of body portion 42. Openings 63 may receive an attachment member 64 that extends through opening 63 to the front side of backboard support member 60. In the embodiment shown in FIG. 7, there are four openings 63 arranged in a square pattern and four attachment members 64 inserted through openings 63. However, other embodiments may have more than or less than four openings, or may have openings 63 configured in a different arrangement than a square shape.

Pin openings 66 are located on each side of attachment bracket 62 and are sized to receive pin supports 68. In this embodiment, there is one pin opening 66 on each side of attachment bracket 62; however, in other embodiments, the total number of pin openings 66 may be greater than or less than two. Also, the location of pin openings 66 may be changed, for example, pin openings 66 may be moved higher or lower on attachment bracket 62. Pin openings 66 are not confined to use strictly by pins. In other embodiments, pin openings may receive other objects such as screws or bolts. In some embodiments pin supports 68 may be cotter pins, but any other type of securing mechanism that may be inserted into pin opening 66 may be used.

Figure 8:
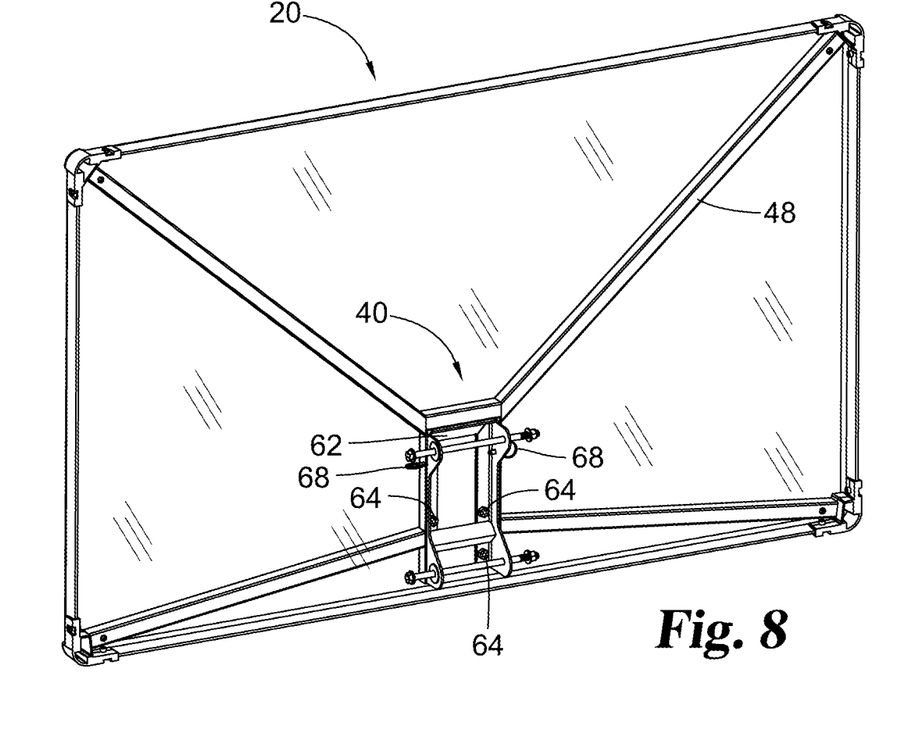
FIG. 8 is a perspective view of the backboard support assembly of FIG. 7 attached to the backboard mounting structure of FIG. 4.

As shown in FIGS. 8 and 10, pin supports 68 may be used to temporarily secure backboard assembly 20 to support assembly 60. In use, backboard assembly 20 is put in place and attachment members 64 are initially inserted through aligned openings 44, so that attachment members 64 extend through openings 44 in body portion 42. Attachment bracket 62 is also positioned adjacent body portion 42 so pin openings 66 on attachment bracket 62 are aligned with pin support openings 46 on body portion 42. Pin supports 68 are then inserted through pin openings 46, 66 to form a preliminary mounting connection. Pin supports 68 have sufficient strength to maintain the attachment between attachment bracket 62 and body portion 42 for further assembly purposes. This is useful when assembling basketball goal 10 because it allows the assembler to let go of backboard assembly 20 and support assembly 60 and use both hands to complete assembly from the front of basketball goal 10.

As shown in FIG. 7, attachment bracket 62 also includes openings 72 for arm attachment members 73 which connect attachment bracket 62 to forward ends of support arms 70. Attachment members 73 may be nut and bolt assemblies forming pivot axles or may be any other type of fastener that is capable of attaching attachment bracket 62 to support arms 70.

In the embodiment shown, there are four attachment arms 70 forming a deformable parallelogram assembly. The arms 70 are arranged in pairs, so that one pair of arms 70 is pivotally attached to the upper portion of attachment bracket 62. One arm is located on each side of attachment bracket 62. The other pair of arms 70 is pivotally attached to the lower portion of attachment bracket 62 with one arm located on each side. Each pair of attachment arms 70 extends rearward from attachment bracket 62 and is pivotally connected to the upper portion of base assembly 80 so that the upper and lower arms 70 on the same side of base assembly 80 form a vertical, deformable parallelogram shape. A gap 74 is formed between arms 70 that run parallel on each side of base assembly 80. In alterative embodiments, any conventional option to mount backboard assembly 20 to a base assembly 80 may be used.

The illustrated base assembly 80 includes a substantially vertical support pole 82 which extends through gap 74 of each pair of attachment arms 70. Support pole 82 may be either perpendicular to the ground or arranged at a slight angle to the ground yet mostly vertical. A pole attachment member, such as a nut and bolt arrangement 83, is inserted through aligned openings 76, 84 in support arms 70 and through base pole 82, respectively. For example, one pair of attachment arms 70 is positioned with base pole 82 in between so that openings 76, 84 are aligned. The user inserts a bolt 83 through opening 76 in the first arm 76. Once bolt 83 is through opening 76, bolt 83 is inserted into opening 84 and through base pole 82. After bolt 83 is passed through base pole 82, bolt 83 is pushed through opening 76 in the parallel arm 70 on the other side of base pole 82. Once through the opposite attachment arm 70, the user secures bolt 83. Appropriate mounting hardware such as washers and bushings may be used as desired.

Other embodiments may include alternative methods of attaching attachment arms 70 to base assembly 80. For example, attachment arms 70 may be welded to base assembly 80, a clamping mechanism may secure attachment arms 70 to base assembly 80, or any other method that effectively attaches attachment arms 70 to base assembly 80 may be used.

As seen in FIG. 7, base assembly 80 extends downward, representatively shown as a base connection 86. It may be a single pole extending downward rather than a connection joint. The lower end of base assembly 80 may be supported by any of a variety of different bases. As an example, base assembly 80 could be the support member and base assembly shown in FIG. 1 and in U.S. patent application Ser. No. 14/688,759 (hereby incorporated by reference). Base connection 86 may also connect to a permanent base that is fixed in the ground with cement or by an alternate method.

In some embodiments, attachment arms 70 may be pivotably attached to base assembly 80 to allow the position of backboard assembly 20 to be adjusted so the height of rim assembly 90 may be modified. Additional mechanisms may be added to base assembly 80 to aid with adjustment of the position of attachment arms 70 and to allow the position of attachment arms 70 to be locked once the desired height of rim assembly 90 has been reached.

Figure 9:
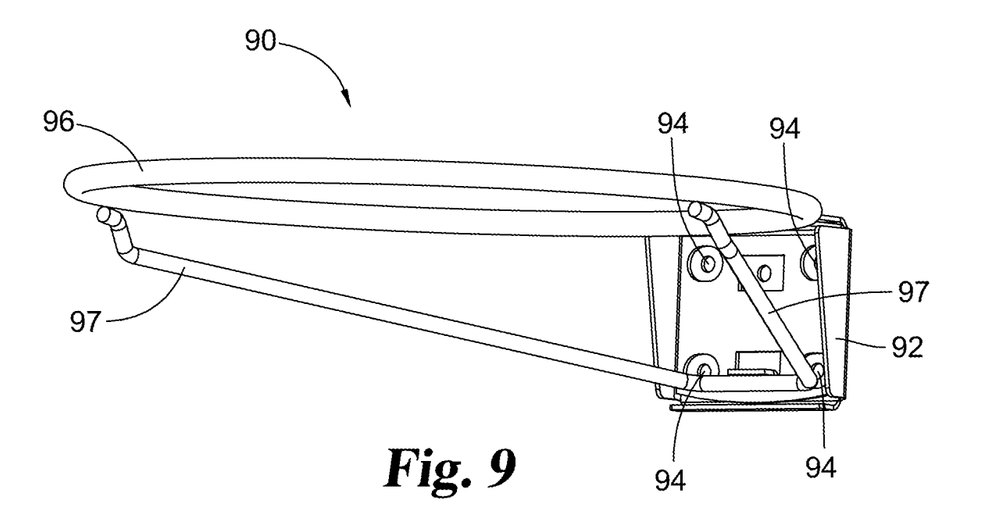
FIG. 9 is a rim assembly of the basketball goal assembly of FIG. 1.

Rim assembly 90 includes a rim bracket 92 with openings 94 that are arranged to align with openings 32 (see FIG. 9). Similar to openings 32, in this embodiment, there are four rim openings 94 that are positioned to form a square shape. Other embodiments may have greater than or fewer than four openings 94, and opening 94 may be positioned in different arrangements. A basketball rim 96 extends forward from rim bracket 92. Rim supports 97 are used to provide support to rim 96 and attach rim 96 to rim bracket 92. One end of each rim support 97 is attached to bracket 92 and the other end of each rim support 97 is attached to basketball rim 96.

In some embodiments, additional components may be installed within rim bracket 92. For example, springs may be mounted on rim bracket 92 to provide increased rim flexibility. In other embodiments, rim assembly 90 may be a breakaway rim. Also, a cover may be added to rim bracket 92 to enclose openings 94, so they are not exposed. Additionally, a net may be attached to rim 96.

As shown in FIGS. 10A and 10B, rim assembly 90 is attached to support assembly 60, via attachment members 64. In order to attach rim assembly 90, a user aligns rim openings 94 with backboard openings 32 and aligns backboard openings 32 with body portion openings 44 and support assembly openings 63. Alignment can be done in separate steps. An attachment member 64 is inserted through the aligned openings 94, 32, 44. In the embodiment shown, attachment member 64 is a nut and bolt system, so the bolt is inserted through openings 94, 32, 44, 63. From the front of the backboard, the nut is then threaded onto the bolt and tightened to secure rim assembly 90 to support assembly 60, with backboard assembly 20 and backboard mounting structure 40 in between.

Figure 11:
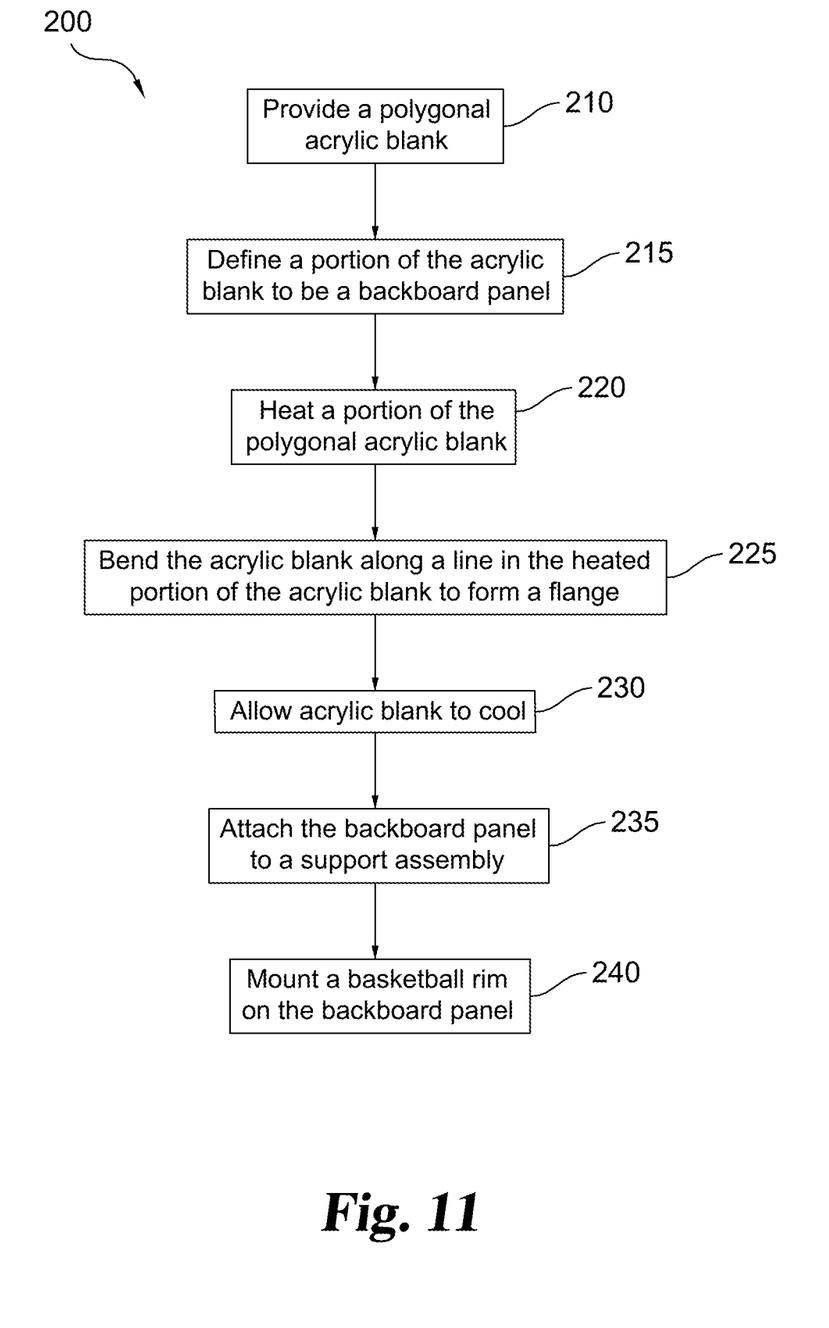
FIG. 11 is a flowchart showing a method of forming a basketball goal assembly.

FIG. 11 is a flowchart 200 for a method of forming a basketball goal assembly 10. A user begins by providing 210 a flat, polygonal blank of a bendable material, such as acrylic or polycarbonate. The blank includes an outside edge and at least one corner. The blank may be a variety of shapes including rectangular, square, or hexagonal. It is possible for a portion of the outside edge of the blank to be curved. In some blanks, the corners or edges may include notches (see FIG. 2) that prevent the bend lines from overlapping, making the blank easier to bend.

A portion of the polygonal blank is defined 215 to be a backboard panel by defining bend lines on the blank. The bend lines do not need to be physically marked. The portion of the blank on the inside of the bend lines is the backboard panel. The portion(s) of the blank that are not part of the backboard panel are the flange portions which will be bent to become flanges. The flange portions are located near the outside edge(s) of the blank.

A portion of the blank near the outside edge is heated 220 along the bend lines to a plastic state. Once the desired portions of the blank are heated, the blank is bent 225 along the heated bend lines to form a flange or multiple flanges that extend at approximately a 90 degree angle from the backboard panel. The blank is bent so the flanges are integral with the backboard panel and extend rearward from the backboard panel.

In some embodiments, each side of the blank may be bent to form flanges. In other embodiments some of the sides of the blank may not be bent. For example, if the blank is rectangular, the user may bend all four sides of the blank to create flanges around the entire outside edge of the blank with corner discontinuities. In other embodiments, the user may bend the blank only along the top edge, creating a single flange along the top edge of the backboard panel while the remaining edges do not have a flange.

After being heated and bent, the blank is allowed 230 to cool and harden, so that it sets in the formed shape. After cooling, a one-piece backboard is formed where the flange or flanges provide support and rigidity to the backboard so it may operate effectively with a basketball goal. Because the flanges provide enhanced rigidity and support to the backboard panel, there is no need to add a metal frame or frame made of any other material around the outside edge of the backboard panel. This reduces the weight and cost of manufacture of the backboard assembly.

After cooling, the backboard panel is attached 235 to a support assembly. The support assembly is mounted to a base assembly that holds the backboard assembly at a desired height above the ground. To complete assembly, a basketball rim is attached 240 to the support assembly.

As an optional step, at least one hole may be created in the backboard panel for use in the attachment of a basketball rim. This hole may be created by drilling or by any other method that produces a hole through the backboard panel. Only one hole may be created, or multiple holes may be created, such as two or four holes. If there are multiple holes, the holes may be created in any shape or arrangement necessary to align with attachment openings in the rim assembly.

In some embodiments, a backboard mounting structure may be secured to the rear side of the backboard panel. The backboard mounting structure has a body portion and at least one support arm. The support arm or support arms may be attached to the outside edge of the backboard panel or to the flanges.

In some embodiments, a corner cap may be attached to the corner portions of the blank. Corner caps may be attached to all of the corners of the blanks or only to a portion of the corners of the blank. In embodiments where the user has attached a backboard mounting structure including support arms, the user may attach one end of the support arm to a corner cap. If there are multiple support arms, the user may attach each support arm to a respective corner cap.

Figure 12:
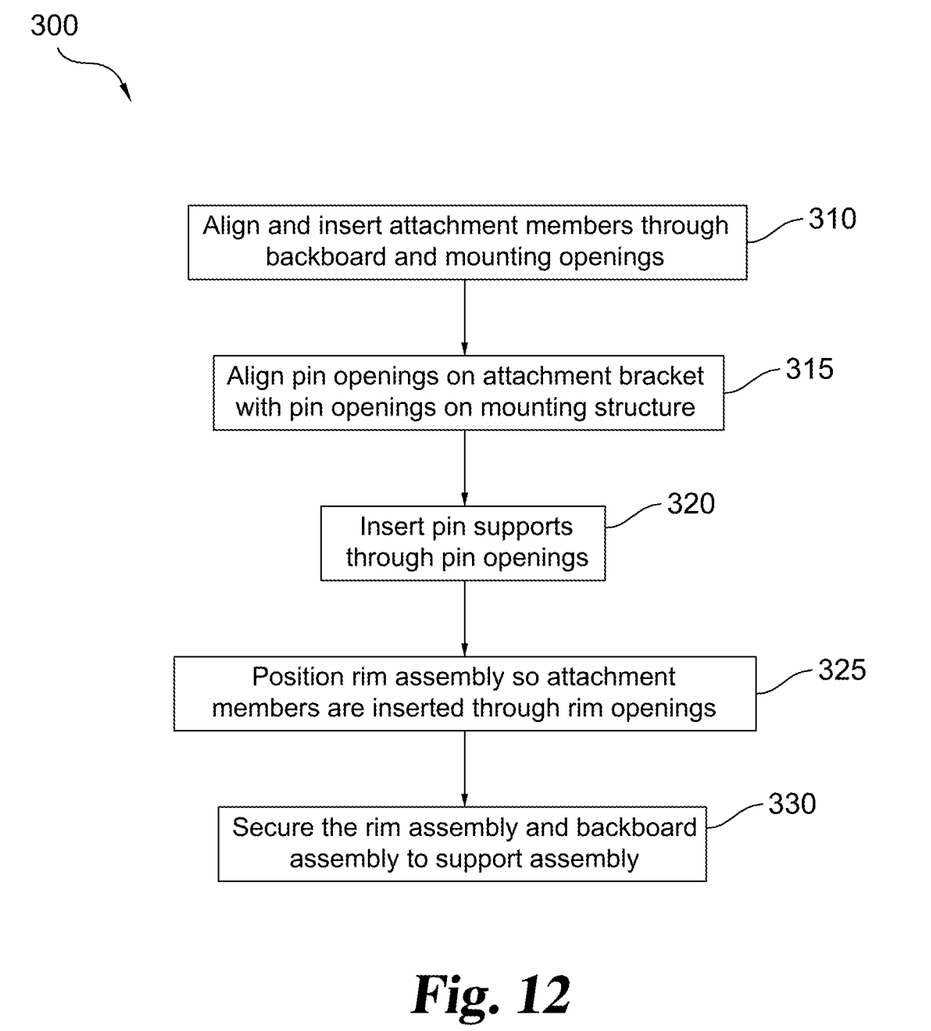
FIG. 12 is a flowchart showing a method of assembling basketball goal assembly.

FIG. 12 is a flowchart 300 that shows a method of assembling basketball goal assembly 10. This method starts with an assembled backboard assembly including a backboard panel and backboard openings that extend through the backboard panel. A backboard mounting structure may be attached to the rear side of the backboard panel. The backboard mounting structure includes a body portion with openings that align with the backboard openings when the backboard mounting structure is attached to the backboard panel.

The attachment bracket of a support assembly is brought into contact with the body portion of the backboard mounting structure. Attachment members, such as bolts, located on the attachment bracket are aligned with and inserted 310 through the openings in the backboard panel and mounting structure. When the attachment members have been inserted through the openings, pin openings in the attachment bracket and pin openings in the mounting structure should be aligned 315 to allow one or more pin supports to be inserted 320 through the pin openings. The pin supports temporarily secure the backboard assembly to the support assembly to allow for further assembly of the basketball goal, allowing the user to let go of the backboard assembly while it remains in place on the support assembly.

A rim assembly is positioned 325 so that protruding bolts are inserted through rim openings on the rim assembly. Nuts are then threaded onto their respective bolts to secure 330 the rim assembly and backboard assembly to the support assembly. It should be understood that in alternate embodiments, a user may change the order of the steps performed to assemble basketball goal assembly 10.

Figure 13:
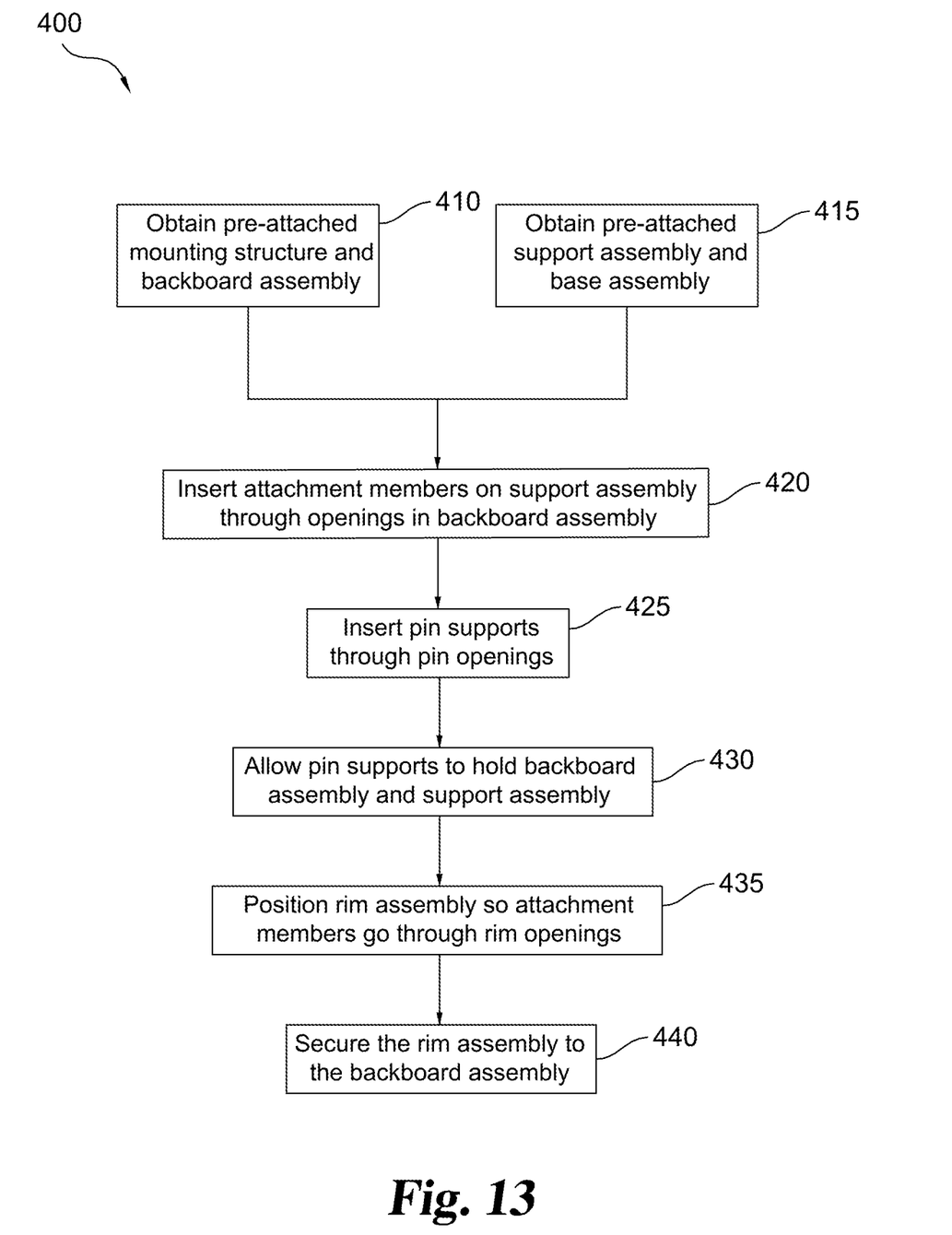
FIG. 13 is a flowchart showing a method of assembling a basketball goal assembly.

FIG. 13 is a flowchart 400 demonstrating a method of assembly for a basketball goal assembly that has been boxed by a manufacturer or another provider. A mounting structure 40 is obtained 410. The structure is pre-attached to a backboard assembly 20 as provided or as assembled by a user in a preliminary step. Also, the support assembly 60 and a base assembly 80 are provided pre-assembled or assembled separately 415.

Next, attachment members 64 on support assembly 60 are inserted 420 through openings 32 in backboard assembly 20. Once attachment members 64 have been inserted, pin supports 68 are inserted 425 through openings 66 so pin supports 68 preliminarily secure support assembly 60 to backboard assembly 20. This allows 430 the pin supports to hold support assembly 60 to backboard assembly 20 without any further help. For example, a person assembling basketball goal 10 may let go of the backboard assembly and support assembly to continue the rest of the assembly.

Rim assembly 90 is then positioned 435 on attachment members 64. Once the attachment members extend through the rim openings the attachment members are tightened or fixed to secure 440 the rim assembly and backboard assembly to the support assembly.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed:

1. A method of producing a frameless basketball backboard assembly, the method comprising:
   providing a pre-formed flat polygonal blank of an acrylic or polycarbonate material;
   defining a portion of the blank to be a backboard panel, wherein the backboard panel has a front surface and defining at least one flat flange integral with and planar to the backboard panel and adjacent to an outside edge of the blank wherein a bend line is defined between the backboard panel and the flange;
   bending the flat flange relative to the backboard panel along the bend line by pivoting the flat flange along an axis defined by the bend line so that the at least one flange extends rearward from the backboard panel;
   attaching the backboard panel to a support assembly, wherein the support assembly is attached to a base assembly; and
   mounting a basketball rim to the support assembly.

2. The method of claim 1, comprising:
   bending the blank along multiple bend lines to form multiple flanges, wherein each flange extends rearward from the backboard panel.

3. The method of claim 2, comprising: attaching a corner cap to at least one corner of the backboard panel so that the front of the corner cap is flush with the front surface of the backboard panel, and wherein the corner cap includes at least two channels, wherein each of the two channels is configured to receive an end portion of one of a pair of adjacent flanges.

4. The method of claim 1, wherein the pre-formed blank includes at least one notched corner.

5. The method of claim 1, wherein the polygonal blank is rectangular and includes four corners, wherein the blank defines a top edge, a bottom edge, and two side edges, wherein the blank defines a notch in each corner, and the method comprising defining a bend line parallel to each of the edges, wherein each bend line intersects two notches.

6. The method of claim 5, comprising: bending the blank along each bend line to form a rectangular backboard panel with a rearward extending flange along each edge.

7. The method of claim 5, comprising: attaching four corner caps to the four corners of the blank so the front of each corner cap is flush with the front surface of the backboard panel, and wherein each corner cap includes at least two channels, wherein each of the two channels is configured to receive an end portion of one of a pair of adjacent flanges.

8. The method of claim 7, comprising: attaching a backboard mounting structure to the four corner caps, wherein the backboard mounting structure includes a body portion arranged adjacent a center-bottom portion of the rear of the backboard panel and four support arms which extend outward and parallel to the backboard panel from the body mounting portion and connect to the four corner caps.

9. The method of claim 8, wherein the blank is transparent.

10. The method of claim 1, comprising: bending the flat flange relative to the backboard panel along the bend line at a temperature below the melting point of the acrylic or polycarbonate blank material.

11. A method of producing a frameless basketball backboard assembly, the method comprising:
defining a portion of a flat rectangular blank of an acrylic or polycarbonate material with notched corners to be a rectangular backboard panel, wherein the backboard panel has a front surface, and defining four flat flange portions planar to the backboard panel and adjacent to outside edges of the blank wherein a bend line is defined between the backboard panel and each flange portion;
bending the flat flange portion rearward relative to the backboard panel along the bend lines by pivoting each flange portion along an axis defined by a bend line;
attaching four corner caps to the four corners of the backboard panel so that the front of each corner cap is flush with the front surface of the backboard panel, and wherein each corner cap includes at least two channels, wherein each channel is configured to receive an end portion of one of a pair of adjacent flange portions;
attaching a backboard mounting structure to the four corner caps, wherein the backboard mounting structure includes a body portion arranged adjacent a center-bottom portion of the rear of the backboard panel and four support arms which extend outward and parallel to the backboard panel from the body of the mounting portion to connect to the four corner caps; and
mounting a basketball rim to a support assembly attachment bracket with the backboard panel and the backboard mounting structure body portion sandwiched between the rim assembly and the support assembly.

12. The method of claim 11, wherein the corner cap is L-shaped and wherein the pair of channels are perpendicular to each other.

13. The method of claim 12, wherein each corner cap has a leg that extends toward the middle of the backboard panel and which fits inside a hollow end of a support arm.

14. The method of claim 11, comprising: bending the flat flange portion relative to the backboard panel along the bend line at a temperature below the melting point of the acrylic or polycarbonate blank material.

15. The method of claim 11, wherein the rim assembly is connected to the support assembly attachment bracket via attachment members that pass through openings defined in the backboard panel and backboard mounting structure so that force applied to the rim assembly is transferred to the support assembly without being transferred to the backboard panel and backboard mounting structure.

16. A method of producing a frameless basketball assembly, the method comprising:
providing a blank of an acrylic or polycarbonate material wherein a portion of the blank defines a backboard panel with a front face, an outer perimeter, and at least one corner;
bending a pair of flanges rearward from the outer perimeter of the backboard panel, wherein the pair of flanges have adjacent end portions; and
attaching a corner cap to the at least one corner cap to the at least one corner wherein a front of the corner cap is flush with the front fact of the backboard panel, and wherein the corner cap defines a pair of channels which each receive an adjacent end portion of the pair of flanges.

17. The method of claim 16, wherein the corner cap is L-shaped and wherein the pair of channels are perpendicular to each other.

18. The method of claim 17, wherein each channel has a depth defined by the front to rear thickness of the corner cap and the depth is perpendicular to the front face of the backboard panel.

19. The method of claim 16, comprising: attaching a support arm to the corner cap wherein the support arm extends parallel to the backboard panel from a mounting structure portion arranged adjacent a center-bottom portion of the rear of the backboard panel.

20. The method of claim 19, wherein the corner cap has a leg that extends toward the middle of the backboard panel and which fits inside a hollow end of the support arm.

* * * * *